United States Patent [19]
Oertley

[11] Patent Number: 5,873,640
[45] Date of Patent: Feb. 23, 1999

[54] UNDERCARRIAGE SHAFT SUPPORT

[75] Inventor: Thomas E. Oertley, Dunlap, Ill.

[73] Assignee: Caterpillar Inc., Peoria, Ill.

[21] Appl. No.: 607,536

[22] Filed: Feb. 27, 1996

[51] Int. Cl.$^6$ .................................................. B62D 55/15
[52] U.S. Cl. .......................... 305/138; 301/132; 180/9.1; 403/344
[58] Field of Search .............................. 180/9.1; 280/713, 280/705; 403/344, 336; 301/114, 132; 305/116, 138

[56] References Cited

U.S. PATENT DOCUMENTS

| | | |
|---|---|---|
| 264,524 | 9/1882 | Githens . |
| 1,018,427 | 2/1912 | Killingsworth . |
| 1,679,028 | 7/1928 | Gallman . |
| 3,871,462 | 3/1975 | Krolak et al. .......................... 180/9.1 X |
| 4,428,697 | 1/1984 | Ruland ..................................... 403/344 |
| 4,460,290 | 7/1984 | Mallet ..................................... 403/373 |
| 4,848,951 | 7/1989 | Boogerman et al. ...................... 403/24 |
| 5,044,816 | 9/1991 | Junkes ..................................... 403/344 |
| 5,318,375 | 6/1994 | Entrup et al. ............................ 403/359 |

OTHER PUBLICATIONS

British drawing 7255, one sheet, 1904.

*Primary Examiner*—Donald W. Underwood
*Attorney, Agent, or Firm*—John J. Cheek; Dennis C. Skarvan

[57] ABSTRACT

An undercarriage of a belted or track-type machine includes a drive wheel rotatably mounted to the machine and a roller frame assembly pivotally mounted to the machine. The roller frame assembly includes at least one idler wheel and a number of guide rollers. Stationary shafts are mounted to the roller frame assembly and rotationally support the idler wheel and guide rollers. Mounting caps clamp the stationary shafts to the roller frame assembly. One or more fasteners fasten an end portion adjacent to the shaft engaging portion of the mounting cap in abutting contact with the roller frame assembly. A single fastener fastens the other end portion of the mounting cap to the roller frame assembly; however, the other end portion is spaced apart from the roller frame assembly. The abutting contact between the mounting cap and roller frame assembly minimizes flexure of the fasteners and movement of the shaft under moment loading.

5 Claims, 2 Drawing Sheets

Fig_1_

5,873,640

UNDERCARRIAGE SHAFT SUPPORT

TECHNICAL FIELD

The present invention relates generally to the undercarriage of a belted or track-type work machine and, more particularly, to the mounting of the idler and roller wheel stationary shafting of the undercarriage.

BACKGROUND ART

In a typical undercarriage, a drive wheel assembly drives an endless belt or track which encircles and is guided by various combinations of idlers and rollers. My prior U.S. Pat. No. 5,358,064, Track-Type Vehicle Undercarriage; U.S. Pat. No. 5,333,710, Undercarriage for Track-Type; U.S. Pat. No. 5,279,377, Track-Type Vehicle Undercarriage; U.S. Pat. No. 5,069,509 Endless Track Chain with Rotatable Sleeve; U.S. Pat. No. 4,881,930, Sprocket Assembly; and U.S. Pat. No. 4,818,041, Idler Wheel Assembly for Track-Type Vehicle are directed to one or more aspects of such an undercarriage.

The mounting of the various idlers and rollers in an undercarriage includes a stationary shaft clamped to the frame of the undercarriage. The various idlers and rollers rotate about the stationary shaft. In one specific mounting arrangement, a mounting cap clamps the stationary shaft to the undercarriage frame via a pair of fasteners. In this specific arrangement, the mounting cap does not abut the frame, and all of the clamp load is transferred across the stationary shaft. As a result, moment loading reacted by the shaft tends to result in movement of the mounting cap and flexure of the fasteners. What is needed is a mounting cap clamping arrangement which minimizes such movement. Preferably, such a mounting cap arrangement would be useful in combination with the above-described issued patents, the contents of which are hereby incorporated by reference.

DISCLOSURE OF THE INVENTION

According to one embodiment of the present invention, an undercarriage of a belted or track-type machine is disclosed comprising a drive wheel adapted for rotatably mounting to the machine, a roller frame assembly adapted for pivotally mounting to the machine, the roller frame assembly including at least one idler wheel and a number of guide rollers, an endless belt or track encircling the drive wheel, the idler wheel and the number of guide rollers, a first stationary shaft mounted to the roller frame assembly, the idler wheel being rotatably mounted to the roller frame assembly about the first stationary shaft, a first mounting cap for clamping the first stationary shaft to the roller frame assembly, the first mounting cap including a shaft engaging central portion and first and second end portions disposed at either side of the shaft engaging central portion, wherein one of the first and second end portions is clamped in contact with the roller frame assembly and the other of the first and second end portions defines a gap between the other end portion and the roller frame assembly.

According to another embodiment of the present invention, an undercarriage of a belted or track-type machine is disclosed comprising a roller frame assembly including at least one idler wheel and at least one guide roller, a first stationary shaft mounted to the roller frame assembly, the idler wheel being rotatably mounted to the roller frame assembly about the first stationary shaft, a second stationary shaft mounted to the roller frame assembly, the guide roller being rotatably mounted to the roller frame assembly about the second stationary shaft, a first mounting cap for clamping the first stationary shaft to the roller frame assembly, the first mounting cap including a first shaft engaging central portion and first and second end portions disposed at either side of the first shaft engaging central portion, a second mounting cap for clamping the second stationary shaft to the roller frame assembly, the second mounting cap including a second shaft engaging central portion and third and fourth end portions disposed at either side of the second shaft engaging central portion, wherein one of the first and second end portions and one of the third and fourth end portions is clamped in contact with the roller frame assembly and the other of the first and second end portions and the other of the third and fourth end portions defines a gap between the other of the first and second end portions and the roller frame assembly and between the other of the third and fourth end portions and the roller frame assembly.

According to another embodiment of the present invention, an undercarriage of a belted or track-type machine is disclosed comprising a roller frame assembly including at least one idler wheel and guide roller, a stationary shaft mounted to the roller frame assembly, wherein one of the idler wheel and the guide roller is rotatably mounted to the roller frame assembly about the stationary shaft, a mounting cap adapted for clamping the first stationary shaft to the roller frame assembly, the mounting cap including a shaft engaging central portion and first and second end portions, a first fastener for fastening between the first end portion and the roller frame assembly, the first end portion being in contact with the roller frame assembly when the mounting cap is clamped to the roller frame assembly, a second fastener for fastening between the second end portion and the roller frame assembly, the second end portion being spaced apart from the roller frame assembly when the mounting cap is clamped to the roller frame assembly.

BEST MODE FOR CARRYING OUT THE INVENTION

Figure 1:
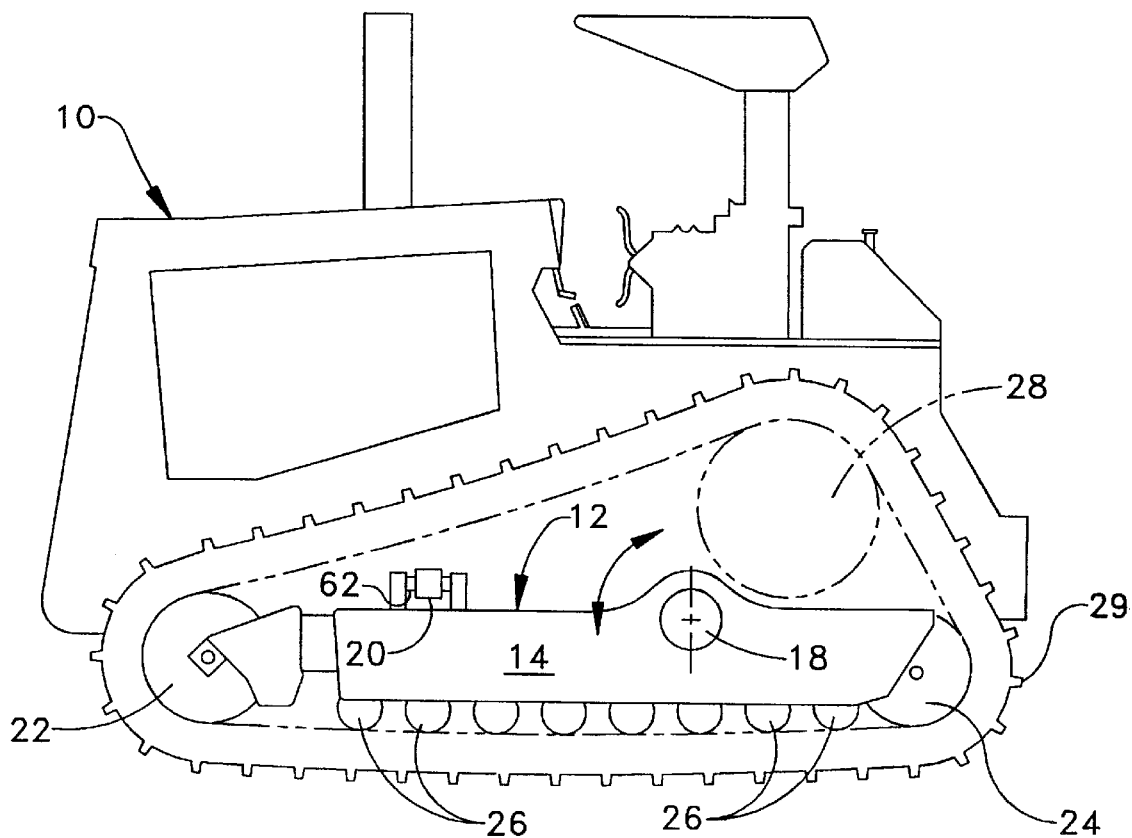
FIG. 1 is a side elevational view of a track-type tractor according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a track-type machine 10 includes an undercarriage structure 12. Undercarriage structure 12 includes first and second spaced apart roller frame assemblies 14 (only one of which is shown), a pivot shaft 18, and an equalizer bar 20. Each of the first and second roller frame assemblies includes first and second idler wheels 22,24 and a plurality of guide rollers 26. A drive sprocket wheel 28 is positioned on each side of the vehicle 10 and is powered in forward and reverse directions by the machine 10. An endless track chain assembly 29 encircles each drive sprocket 28, the first and second idler wheels 22,24, and the rollers 26. The track chain assembly 29 includes a plurality of interconnected metal track links and a plurality of track shoes secured to the track links (not shown). The idler wheel assemblies 22,24 and guide rollers 26 guide the track links as the track chain assembly 29 is driven by the drive sprocket 28.

Figure 2:
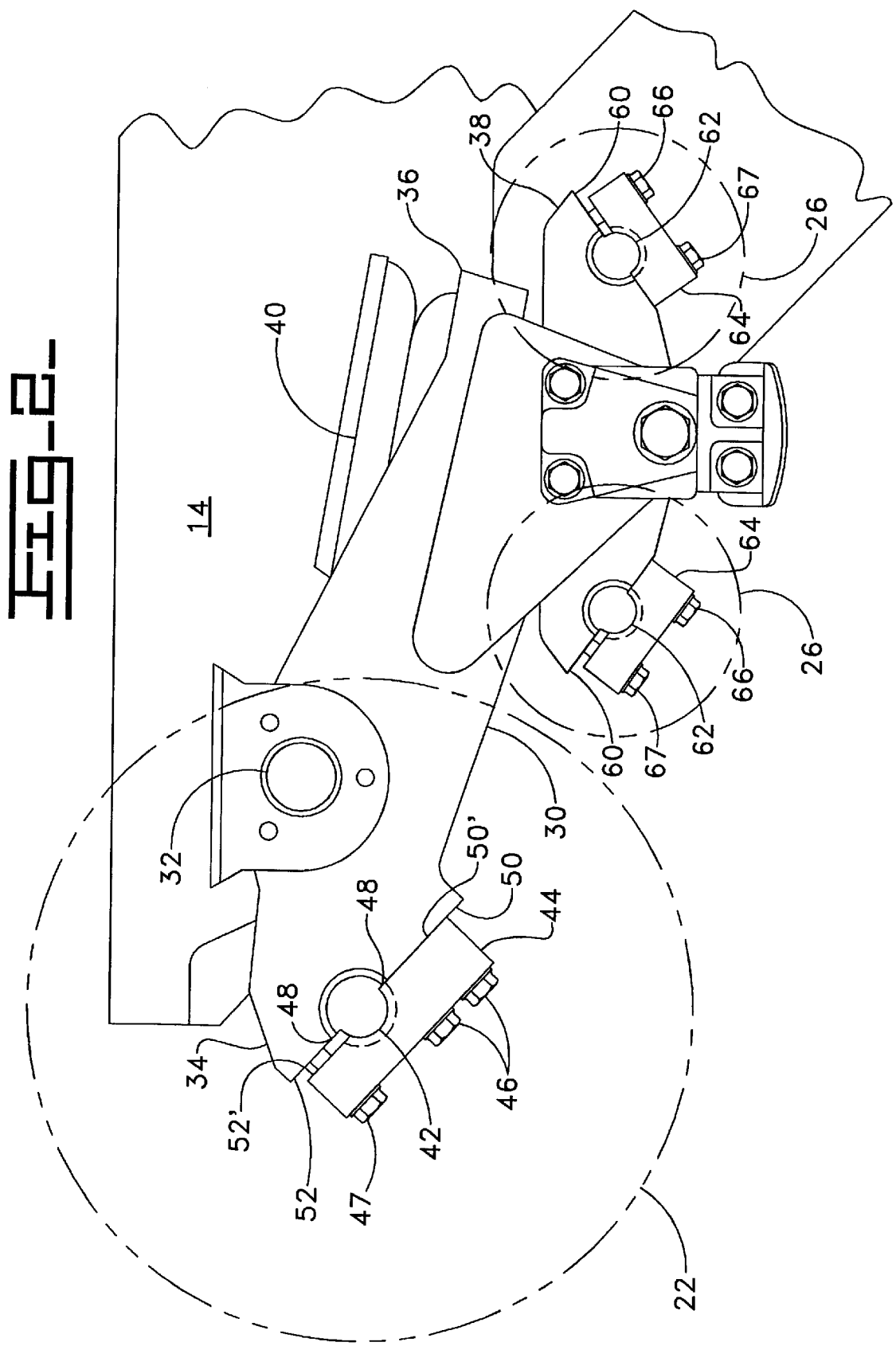
FIG. 2 is an exploded view of the idler wheel and shaft mounting arrangement shown in FIG. 1.

Referring now to FIG. 2, the mounting of idler wheel 22 and roller wheels 26 is shown in greater detail. Given that each roller frame assembly 14 is of like construction, one roller frame assembly 14 will be discussed below with the understanding that like components and assemblies are also included in the opposite roller frame assembly 14. Roller frame assembly 14 includes a first frame member 30 pivotally mounted about an axle 32. Frame member 30 defines a first end portion 34 which supports idler wheel assembly 22 and a second end portion 36 which supports roller wheels 26 via a roller wheel frame assembly 38. Frame member 30 is biased against machine 10 by a spring 40 for movement about axle 32. Spring 40 is preferably an air spring as shown in FIG. 2 and also provides a measure of damping for frame member 30. Frame member 30 is otherwise movable about axle 32 as a result of ground impact loading transmitted through track 30 and idler wheel assembly 22.

First end portion 34 of frame member 30 supports idler wheel assembly 22 via a stationary shaft 42. Shaft 42 is clamped in place against frame member 30 by a mounting cap 44 and fasteners 46,47 as discussed hereinafter in greater detail. In the specific preferred embodiment shown, shaft 42 is constructed having semi-circular cross-sectional halves of differing radii which define shoulders 48 at the joining of the halves. Mounting cap 44 and first end portion 34 define semi-circular grooves corresponding to the differing radii, respectively, of shaft 42 for locating shaft 42 in place relative to first end portion 34. Mounting cap 44 abuts either one of shoulders 48 to index shaft 42 relative to first end portion 34. An alternate shaft mounting arrangement contemplated by the present invention includes a flatted shaft of otherwise constant radius, wherein the circular peripheral portion of the shaft is received in a semi-circular groove of either the mounting cap or end portion and the flatted peripheral portion is received against a flat surface of the other of the mounting cap and end portion.

Regardless of the particular shaft construction, mounting cap 44 is clamped in contact with end portion 34 along only one side of shaft 42. In particular, end portion 34 and mounting cap 44 each define first and second portions 50,50' and 52,52', respectively, disposed on either side of shaft 42. As shown in FIG. 2, first portions 50 and 50' are in contact with one another, while second portions 52 and 52' are spaced apart from one another. It should be noted that the spacing illustrated in the drawings is exaggerated for illustration only and that the actual spacing is in the range of 0.01 inches of total spacing per 1.0 inch of shaft diameter. In a typical application, the shaft diameter ranges between approximately 2.0 to 4.0 inches, thus resulting in a spacing in the range of 0.02 to 0.04 inches.

As a result, loads transmitted from the idler wheel to the frame assembly are reacted through shaft 42 and through fasteners 46. It should be noted that prior art stationary shaft attachments included gaps or spacings on both sides of shaft 42 and loads were reacted through only the shaft. As a result, any moment loading tending to rotate shaft 42 was reacted by the mounting cap 44 through one of shoulders 48, thus tending to vary the loading across the fasteners (for example, decreasing the net loading across one fastener, while increasing the net loading across the other fastener) and rotating mounting cap 44, as well, as the fasteners elastically deformed.

By apportioning the loading between shaft 42 and fasteners 46 in the present embodiment, any moment loading tending to rotate shaft 42 is reacted in one direction (i.e., first portions 50,50') across both the shaft and the mounting cap and frame interface. Moment loading tending to rotate shaft 42 in the opposite direction (i.e., second portions 52,52') is reacted in a similar manner as in the prior art; that is, tending to vary the loading across the fasteners (for example, decreasing the net loading across fastener 47, while increasing the net loading across the other fasteners 46) and rotating mounting cap 44, as well, as the fasteners elastically deformed. However, because two fasteners 46 are utilized to clamp across interface 50,50', the increased loading resulting from such moment loads is split between the two fasteners to reduce deformation (elongation) of the fasteners.

In the specific preferred embodiment shown, moment loading tending to rotate shaft 42 in the direction of first portions 50,50' results from a counter-clockwise rotation of idler wheel assembly 22 (as viewed in FIG. 2) which corresponds to forward movement of machine 10, the predominant mode of operation of machine 10. Conversely, moment loading tending to rotate shaft 42 in the direction of second portions 52,52' results from a clockwise rotation of idler wheel assembly 22 (as viewed in FIG. 2) which corresponds to reverse movement of machine 10, the minimal mode of operation of machine 10.

The roller wheel shafting of roller wheel frame assembly 38 is mounted in a similar manner as that of the idler wheel shafting discussed above. Referring now to roller wheel frame assembly 38, end portions 60 of frame member 38 support roller wheels 26 via stationary shaft 62. Shafts 62 are similarly clamped in place against frame member 38 by mounting caps 64 and fasteners 66,67 as discussed hereinafter in greater detail. The end portions 60 of frame member 38, shafts 62 and mounting caps 64 are constructed similar as described above.

Regardless of the particular shaft construction, mounting caps 64 are clamped in contact with end portions 60 along only one side of each shaft 62. In particular, end portions 60 and mounting cap 64 each define first and second portions disposed on either side of shaft 42. The first portions are in contact with one another, while the second portions are spaced apart from one another.

As a result, loads transmitted from the roller wheels to the frame assembly are reacted through shafts 62 and through fasteners 66. By apportioning the loading between shafts 62 and fasteners 66 in the present embodiment, any moment loading tending to rotate shaft 62 is reacted in one direction across both the shaft and the mounting cap and frame interface. Moment loading tending to rotate shaft 62 in the opposite direction is reacted in a similar manner as in the prior art; that is, tending to vary the loading across the fasteners (for example, decreasing the net loading across fastener 47, while increasing the net loading across the other fastener 46) and rotating mounting cap 44, as well, as the fasteners elastically deformed. In the specific embodiment shown, fasteners 66 and 67 are of like construction.

Also contemplated, however, are fasteners 66 having a larger diameter than fasteners 67. In such a case, the increased loading resulting from such moment loads results in a reduced deformation (elongation) due to the larger diameter of the fastener. In one specific embodiment, for example, fastener 66 would have a diameter on the order of 50% greater than that of fastener 67 to provide increased resistance to deformation. Also contemplated are fasteners 66 constructed of a material having a strength on the order of 50% greater than that of fastener 67, or some combination of increased strength and size.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An undercarriage of a belted or tracked machine, comprising:

a drive wheel adapted for rotatably mounting to said machine;

a roller frame assembly adapted for pivotally mounting to said machine, said roller frame assembly including at least one idler wheel and a number of guide rollers;

an endless belt or track encircling said drive wheel, said idler wheel and said number of guide rollers;

a first stationary shaft mounted to said roller frame assembly, said idler wheel being rotatably mounted to said roller frame assembly about said first stationary shaft;

a first mounting cap for clamping said first stationary shaft to said roller frame assembly, said first mounting cap including a shaft engaging central portion and first and second end portions disposed at either side of said shaft engaging central portion;

wherein one of said first and second end portions is clamped in contact with said roller frame assembly and the other of said first and second end portions defines a gap between said other end portion and said roller frame assembly.

2. The undercarriage of claim 1 further comprising:

a second stationary shaft mounted to said roller frame assembly, one of said number of guide rollers being rotatably mounted to said roller frame assembly about said second stationary shaft;

a second mounting cap for clamping said second stationary shaft to said roller frame assembly, said second mounting cap including a shaft engaging central portion and first and second end portions disposed at either side of said shaft engaging central portion;

wherein one of said first and second end portions of said second mounting cap is clamped in contact with said roller frame assembly and the other of said first and second end portions of said second mounting cap defines a gap between said other end portion and said roller frame assembly.

3. An undercarriage of a belted or tracked machine, comprising:

a roller frame assembly adapted for pivotally mounting to said machine, said roller frame assembly including at least one idler wheel and at least one guide roller;

a first stationary shaft mounted to said roller frame assembly, said idler wheel being rotatably mounted to said roller frame assembly about said first stationary shaft;

a second stationary shaft mounted to said roller frame assembly, said at least one guide roller being rotatably mounted to said roller frame assembly about said second stationary shaft;

a first mounting cap for clamping said first stationary shaft to said roller frame assembly, said first mounting cap including a first shaft engaging central portion and first and second end portions disposed at either side of said first shaft engaging central portion;

a second mounting cap for clamping said second stationary shaft to said roller frame assembly, said second mounting cap including a second shaft engaging central portion and third and fourth end portions disposed at either side of said second shaft engaging central portion;

wherein one of said first and second end portions and one of said third and fourth end portions is clamped in contact with said roller frame assembly and the other of said first and second end portions and the other of said third and fourth end portions defines a gap between said other of said first and second end portions and said roller frame assembly and between said other of said third and fourth end portions and said roller frame assembly.

4. An undercarriage of a belted or tracked machine, comprising:

a roller frame assembly adapted for pivotally mounting to said machine, said roller frame assembly including at least one idler wheel and guide roller;

a stationary shaft mounted to said roller frame assembly, wherein one of said idler wheel and said guide roller is rotatably mounted to said roller frame assembly about said stationary shaft;

a mounting cap adapted for clamping said first stationary shaft to said roller frame assembly, said mounting cap including a shaft engaging central portion and first and second end portions;

a first fastener for fastening between said first end portion and said roller frame assembly, said first end portion being in contact with said roller frame assembly when said mounting cap is clamped to said roller frame assembly;

a second fastener for fastening between said second end portion and said roller frame assembly, said second end portion being spaced apart from said roller frame assembly when said mounting cap is clamped to said roller frame assembly.

5. An undercarriage of a belted or tracked machine comprising:

a roller frame assembly adapted for pivotally mounting to said machine, said roller frame assembly including at least one idler wheel and guide roller;

a stationary shaft mounted to said roller frame assembly, wherein one of said idler wheel and said guide roller is rotatable mounted to said roller frame assembly about said stationary shaft;

a mounting cap adapted for clamping said first stationary shaft to said roller frame assembly, said mounting cap including a shaft engaging central portion and first and second end portions;

a first fastener for fastening between said first end portion and said roller frame assembly, said first end portion being in contact with said roller frame assembly when said mounting cap is clamped to said roller frame assembly;

a second fastener for fastening between said second end portion and said roller frame assembly, said second end portion being spaced apart from said roller frame assembly when said mounting cap is clamped to said roller frame assembly; and a third fastener for fastening between said first end portion and said roller frame assembly;

wherein said first fastener and said third fastener provide double the clamp load of said second fastener.

* * * * *